United States Patent [19]

Schweizer et al.

[11] Patent Number: 4,912,633
[45] Date of Patent: Mar. 27, 1990

[54] HIERARCHICAL MULTIPLE BUS COMPUTER ARCHITECTURE

[75] Inventors: Paul T. Schweizer, Centerville, Ohio; Michael L. Carroll, Pierceton, Ind.

[73] Assignee: NCR Corporation, Dayton, Ohio

[21] Appl. No.: 261,537

[22] Filed: Oct. 24, 1988

[51] Int. Cl.⁴ ............................................. G06F 15/16
[52] U.S. Cl. .................... 364/200; 364/228.1; 364/228.3; 364/230; 364/230.4
[58] Field of Search .................... 364/200, 300, 900

[56] References Cited

U.S. PATENT DOCUMENTS

| | | | |
|---|---|---|---|
| 4,099,236 | 7/1978 | Goodman et al. | 364/200 |
| 4,368,514 | 1/1983 | Persaud et al. | 364/200 |
| 4,376,973 | 3/1983 | Chivers | 364/200 |
| 4,396,978 | 8/1983 | Hammer et al. | 364/200 |
| 4,674,033 | 6/1987 | Miller | 364/200 |
| 4,688,171 | 8/1987 | Selim et al. | 364/200 |

*Primary Examiner*—Raulfe B. Zache
*Attorney, Agent, or Firm*—Wilbert Hawk, Jr.; Casimer K. Salys; Douglas S. Foote

[57] ABSTRACT

A modular and hierarchical multiple bus computer architecture in which the master bus and slave bus are substantially identical, and communicate through a combination of an interface controller and a shared dual port RAM responsive to a shared RAM controller. Processor engine modules including a bus, a processor, an interface controller, a shared dual port RAM, and a shared RAM controller are horizontally and/or vertically integrated at multiple levels without major restructuring of the composite system control operations by having each slave processor engine module interface as a peripheral upon the bus of its master. The modularity of the architecture allows the use of standard peripherals and platform processor engines to expand memory or increase functionality without burdening the master bus processor engine. Each slave bus processor engine is fully functional as an independent processor with mastery over its own bus. The architecture is particularly efficient in extended data base, fault tolerant data base or multi-communication system adapter interface functions.

3 Claims, 4 Drawing Sheets

HIERARCHICAL MULTIPLE BUS COMPUTER ARCHITECTURE

BACKGROUND OF THE INVENTION

The present invention relates to data processing systems, and more particularly to modular systems comprised of multiple processors which are arranged hierarchically and characterized by substantially identical bus structures.

The proliferation of personal computer type data processing systems utilizing a limited class of microprocessor models has created a secondary market involving printed circuit board level products which provide new or extended features at relatively nominal costs. The architecture of such conventional personal computer systems facilitates the usage of secondary market products through the presence of a master or system bus shared not only by the master microprocessor, master memory, and input/output, but also by any peripheral devices connected to the bus, including but not limited to co-processors, communication controllers, and disk controllers. Management of all the devices connected to the master bus is under the control of the microprocessor, which itself is responsive to the operations defined by software whether resident in the microprocessor in the form of microcode or resident in bus addressable memory.

The variety of the products directly connectable to the master bus continues to expand both in feature diversity and performance. Unfortunately, even intelligent peripherals attached to the master bus require significant intervals of microprocessor operating time to exercise the additional functions. Though the recent advent of "smart" peripherals has reduced the number and types of operations performed by the master microprocessor, such gains are often offset by increases in the number of peripherals on the master bus. The effect of using single master bus architecture as the peripheral count increases is to reduce the effective data processing rate of the personal computer system.

The conventional industry response to such degradations of the personal computer data processing speed has been to increase the microprocessor speed, with the undesired effect of requiring higher speed RAM or cashe memory architectures, or to elevate the intelligence of the peripherals, in the sense of making "smart" printed circuit board type peripheral products. Nevertheless, the shared use of the master bus by an increasing count of peripherals will continue to burden the master microprocessor.

One approach to the problem of maintaining processor speed in the face of additional peripherals is disclosed in U.S. Pat. No. 4,484,273. According to that teaching, the common computer system bus is supplemented by two additional bus systems. The first of the supplemental buses is shared by a multiplicity of processor devices and interfaces to the common system bus. The second supplemental bus is shared by multiple memories and peripheral units, likewise connected to the common system bus through multiple interfaces. Though the data processing capability of such a system is elevated, the unique architecture and software to implement the memory sharing, interface operations and processor executive control functions are incompatible with prevailing personal computers architecture standards.

An architecture somewhat more similar to the present invention appears in the TMS 9650 Multiprocessor Interface (MBIF) Data Manual recently published by Texas Instruments Corporation in support of the TMS 9650 product. According to that master system bus which is shared by the host/master processor and the main memory. All slave buses are connected through the TMS 9650. Each slave bus includes individual microprocessor, memory and input/output functional blocks, so that the TMS 9650 performs the operations of an intelligent peripheral controller. Although main memory direct access is a contemplated variant of the architecture, there is no simultaneous sharing of memory between the master system bus and the slave bus suitable to make the slave bus an autonomous master bus for a next successive level in the architecture.

Consequently, there exists a need for a computer system architecture in which the buses are suitable for hierarchical configuration without defined limits in the context of a standardized circuit board type product. When operated in a master-slave mode, the architecture must provide a bus structure and operating system environment in which the master bus can control a multiplicity of slave peripherals which are themselves each masters of a hierarchically distinct level of bus.

SUMMARY OF THE INVENTION

The desired objectives are accomplished, and the deficiencies in the prior at are satisfied, by defining a modular and hierarchical architecture in which the buses at each incremental level are substantially identical. The interconnecting module structures include at each level a processor, an interface controller, a shared RAM controller, and a shared dual port RAM. The presence of dual port shared RAM between successive and substantially identical buses extends the resources of the RAM without restricting substantially autonomous operation of the respective buses.

The present modular and hierarchical multiple bus architecture contemplates both serial and parallel arrangements at each bus level, in such a way that any processor engine module which is connected onto the master bus as a slave incorporates its own distinct bus, which distinct slave bus is under the mastery of the module or slave processor. The slave bus is fully capable of having modules connected thereto. Such hierarchically lower levels of slave modules can be similar processor engine modules or more conventional peripheral devices, such as input/output, mass memory or co-processor boards. The master bus is not restricted to the inclusion of a single processor engine module, and as such may be in control of multiple slave function processor engine modules, which, according to the present hierarchical architecture, are themselves further extendable.

Each processor engine module within the presently defined Processor Interconnect Architecture (PICA) communicates with its hierarchical master bus through the combination of an interface controller, shared RAM controller, and shared dual port RAM as if the module were a peripheral on the master bus. The presence of a shared dual port RAM within each processor engine module (PEM) permits the master bus to directly access data within the slave situated PEM, in contrast to initiating a communication sequence with the slave PEM. Consequently, the processor in the slave PEM is not distracted from executing its existing program or forced to yield control over its bus and any peripherals connected to such slave bus.

These and other unique features of the present invention will be more clearly understood and appreciated upon considering the ensuing detailed description.

DETAILED DESCRIPTION

The present invention contemplates an architecture under which a microprocessor based computer, whether it be referred to as a personal computer or work station, is extended in processing speed or functional capabilities by connecting standardized modules to the master bus, and without materially expanding the operations performed by the master processor engine resident on the master bus. The preferred personal computer or workstation application environment recognizes the cost benefits of using a modular and standardized product to obtain such extensions, and the importance of defining an architecture with migratory upgrades in lieu of replacement system approaches. Furthermore, the presently defined Processor Interconnect Architecture (PICA) as implemented with processor engine modules (PEMs) recognizes the relatively low cost and availability of integrated circuit microprocessors, interface controllers, shared RAM controllers and dual port RAM devices. Essential to the invention is the concept of having each PICA PEM connected to the master processor engine bus to itself create a substantially identical bus for extending without limit the levels of hierarchical configuration, while permitting direct communication between successive master-slave configured buses through levels of shared dual port RAM.

Figure 1:
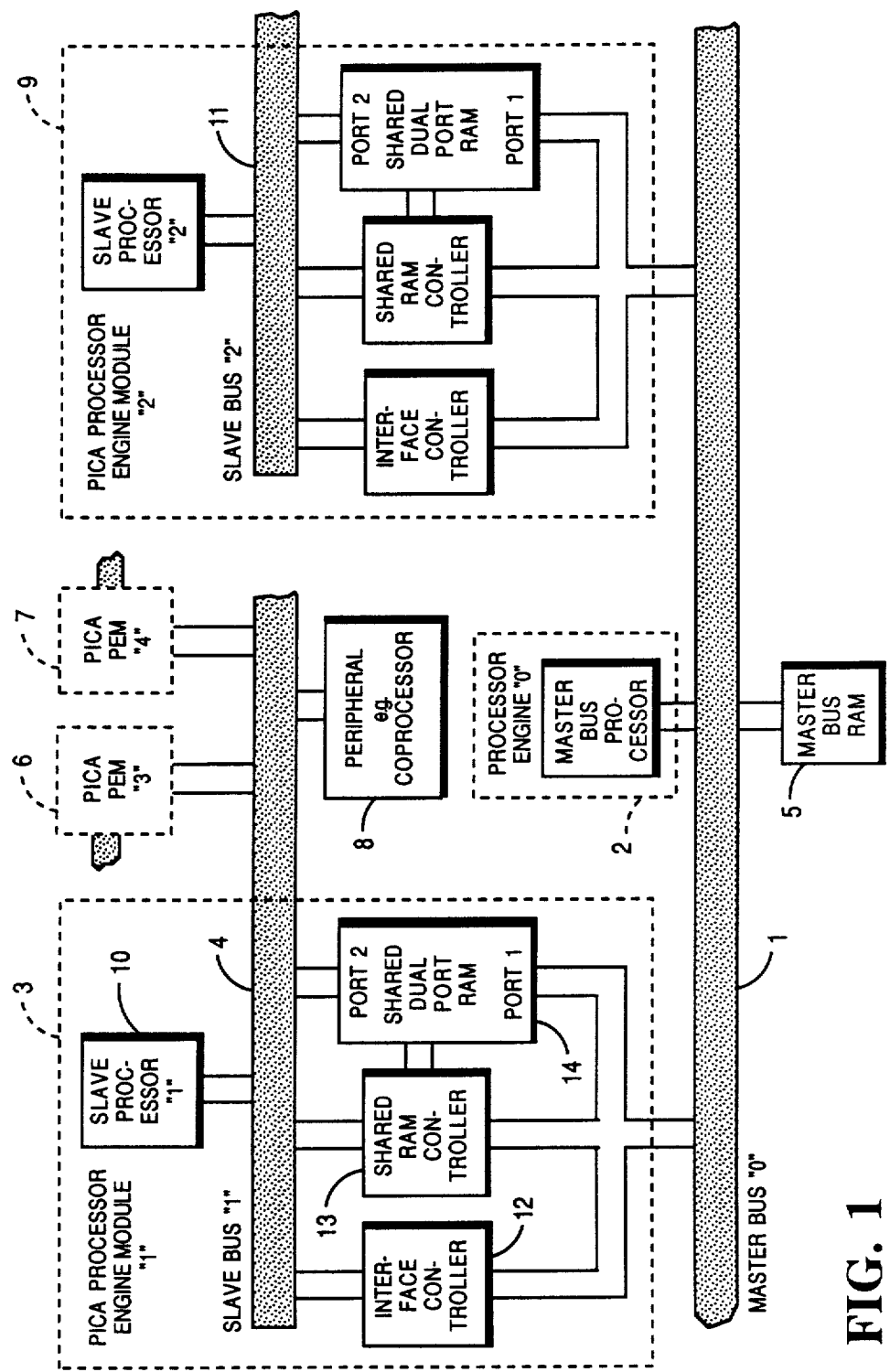
FIG. 1 is a schematic representation of a generalized modular and hierarchical multiple bus computer architecture.

With the fundamental concepts in hand, attention is now directed to FIG. 1 of the drawings for an illustration of the modular and hierarchical multiple bus computer architecture in a generalized form. The arrangement is configured around a master bus "0", identified by reference numeral 1, which has attached thereto a master processor engine "0" identified by reference numeral 2, and a master bus RAM 5. For purposes of reference, the addition of input/output (I/O) functional blocks would complete the architecture of a conventional personal computer at the master level. The present modular and hierarchical architecture is distinguished as shown in FIG. 1 by the further presence of slave level modules, such as PICA PEM "1", identified by reference numeral 3. PICA processor engine module "1" is by definition a slave or peripheral on master bus "0".

The modularity of the hierarchical configuration in FIG. 1 becomes apparent upon recognizing that slave bus "1", identified by reference numeral 4, is substantially identical to master bus "0", so as to provide at a second hierarchical level a completely new bus 4 with integral processor 10 for further addition of peripherals. In keeping with the basic architecture, note that slave bus "1" now serves as the master to further PICA PEMs "3" and "4", individually identified conventional peripherals such as co-processors I/O devices 8.

The modular and multiple architecture to which this invention pertains is not constrained to directly vertical hierarchy in progression from master bus "0" through PICA PEM "1" to PICA PEMs "3" and "4", but inherently includes horizontal modularity such as represented by PICA PEM "2", identified by reference numeral 9, at the master bus "0" level, or by the arrangement of the PICA PEM "3" and "4" on the level of slave bus "1". PICA PEM "2" is a module operated off master bus "0" but with its own bus, slave bus "2", identified by reference numeral 11. Slave buses "1" and "2" are by definition substantially identical to master bus "0". Thereby, the modular architecture of the present invention provides hierarchical graduation both vertically and horizontally at all levels of the bus system.

The internal composition of the PICA processor engine modules make the architecture meaningful by providing, as shown in FIG. 1, a combination of four elements. In the context of PICA PEM "1", the first element is slave bus "1", reference numeral 4, which is substantially identical in size and operational capability to master bus "0". The second element is the interface controller identified by reference numeral 12, which controller is connected between master bus "0" and slave bus "1", and communicates with both. A third necessary element is shared RAM controller 13. Controller 13 is similarly connected between master bus "0" and slave bus "1", but further operatively connected to the fourth element, shared dual port RAM 14. The shared dual port RAM is likewise connected between master bus "0" and slave bus "1", and by virtue of its operational capability can be independently addressed from either master bus "0" or slave bus "1" without contention. Each of the PICA PEMs illustrated in FIG. 1 includes the four basic elements in combination with its own processor.

The elements needed to form a PICA PEM are mandated by a variety of factors. One important consideration is the desire to allow the master and various slave processors to operate at individually defined frequencies. As a consequence, the asynchronous communication between the various buses must be coordinated not only from the perspective of control signals moving through the interface controller but also as to the shared dual port RAM read and write signal coordination provided by the shared RAM controller.

The master bus processor engine "0", as well as the slave processors in each of the other PICA PEMs would, in keeping with convention, execute instructions in accordance with embedded microcode defined by operating system conventional to the personal computer or work station. With the exception of the shared dual port RAM address allocation function, which would be conventionally generated by the software operating the master bus processor engine "0", the operating systems for each slave processor would be similar to the extent that the peripherals attachable to the buses relate. For example, master processor engine "0" as well as PICA PEM "1" are not concerned with the characteristics of the peripherals which may be connected to the slave bus mastered by PICA PEM "3", to the extent that the interface to slave bus "1" from PICA PEM "3" satisfies the address allocations requirements among the shared dual port RAMs.

The master bus and slave processors depicted in FIG. 1 are preferably selected from an identical family of commercially available microprocessors, including but not limited to the Intel 80286 or the Motorola 63000 devices. An exemplary interface controller is the aforementioned Texas Instruments TMS 9650 device. Though the present invention contemplates a relatively intelligent shared RAM controller to extract the enumerated capabilities from the shared dual port RAM, products integrating less refined configurations of shared dual port RAM with controller are already commercially available. An example of the latter is the Integrated Device Technology part IDT7130.

Figure 2:
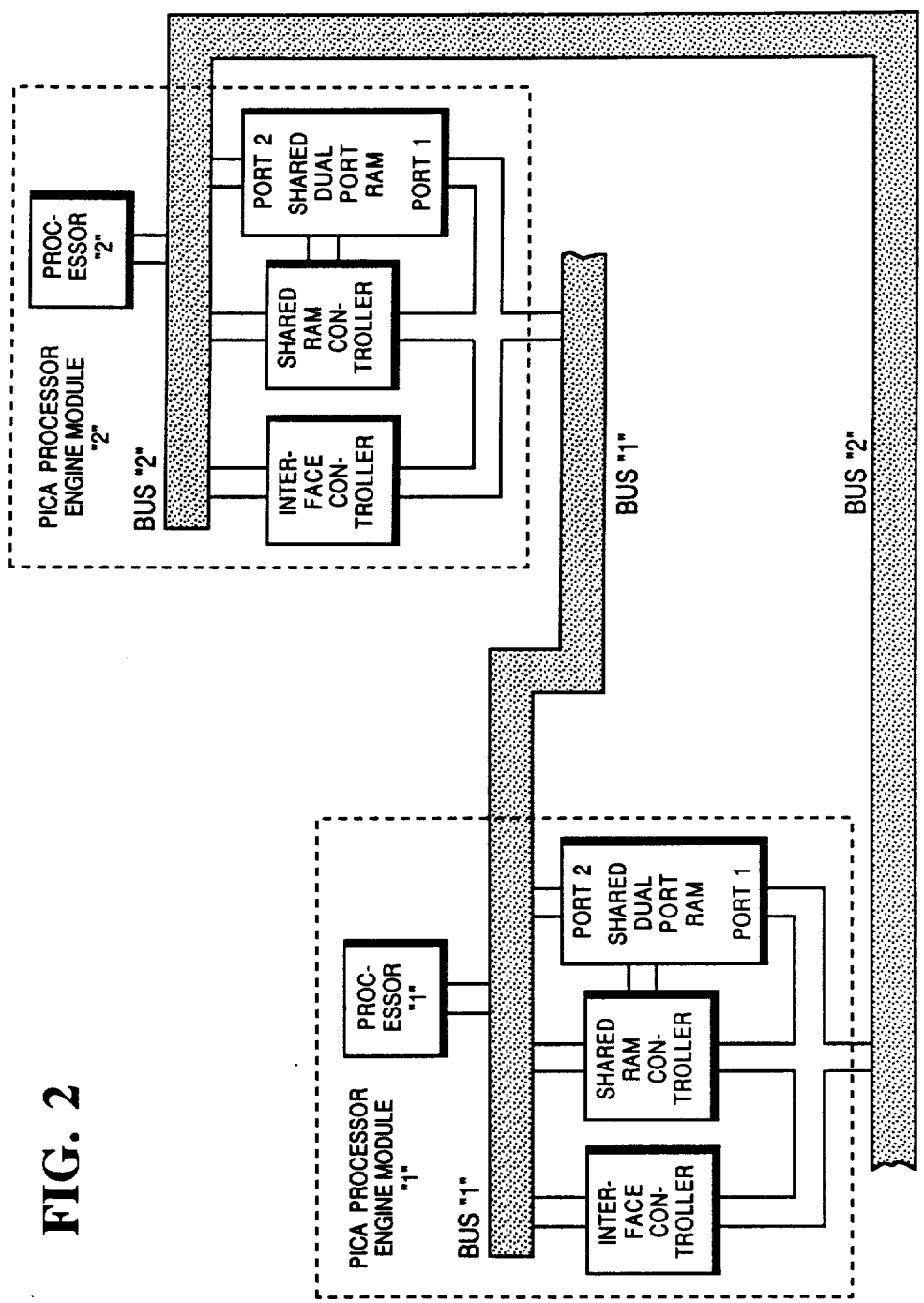
FIG. 2 is a schematic representation of processor engine modules arranged in a feedback configuration.

PICA processor engine modules of the architecture to which this invention pertains provide a modularity that is not limited to direct vertical and horizontal integration, but, as illustrated in FIG. 2, can be configured in a feedback loop arrangement. The architecture of the PICA processor engine modules in FIG. 2 is unique in its provision that PICA PEM "2" is a peripheral to bus "1" of PICA PEM "1" while at the same time PICA PEM "1" is a peripheral on the bus of PICA PEM "2". This arrangement illustrates the diversity attainable from the present module and bus architecture. A prevailing use for the symmetric arrangement depicted in FIG. 2 has yet to full evolved. Conceptually, the architecture exhibits features of parallel processing, as well as more conventional processing to the extent that other peripherals can be attached to either of the buses.

Figure 3:
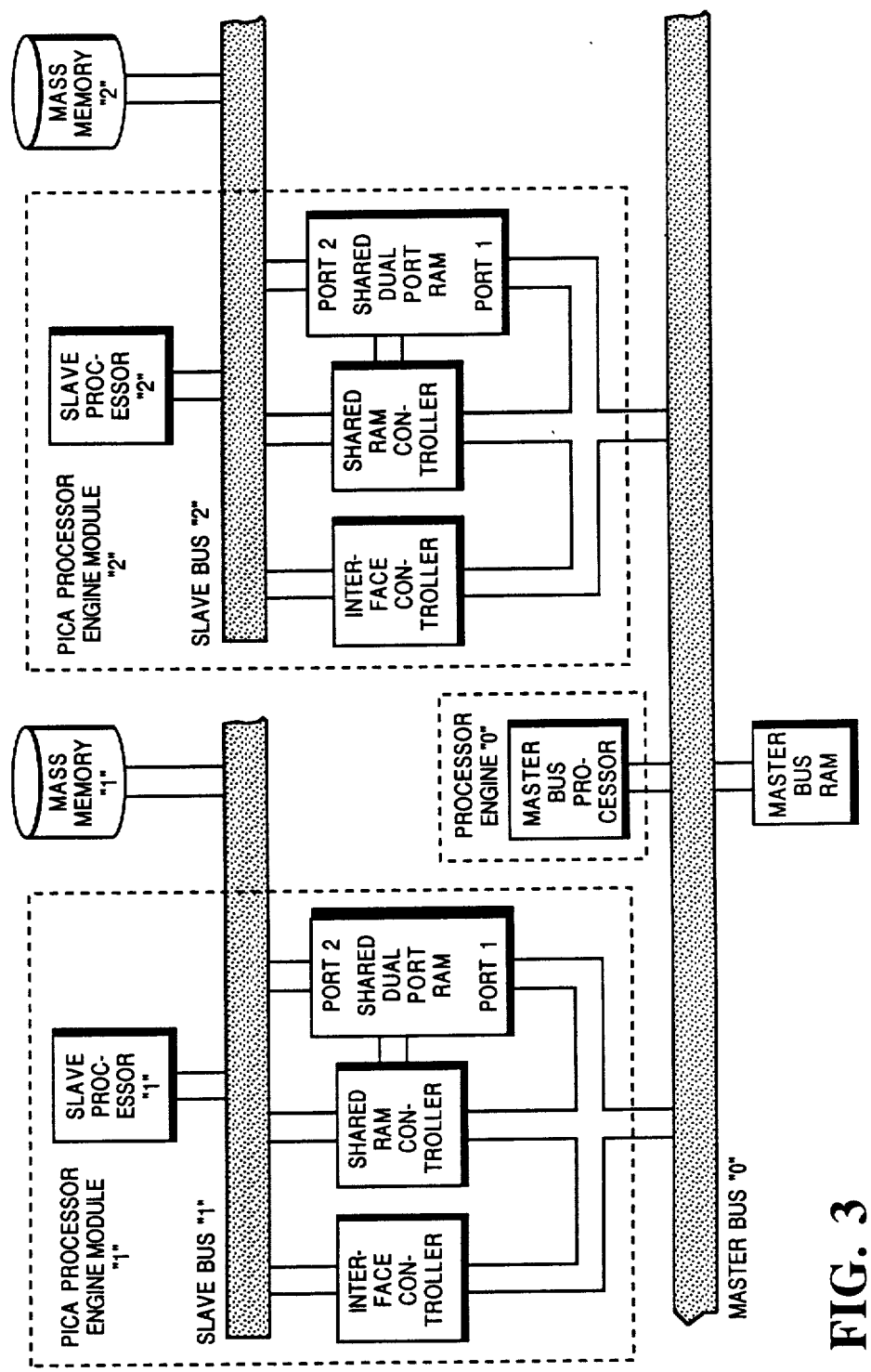
FIG. 3 is a schematic representation of processor engine modules configured to implement a fault tolerant memory system or an extended data base system.

Another potentially useful application for the PICA processor engines of the present modular architecture is illustrated by embodiment in FIG. 3. Here the PICA processor engine modules serve as platforms through which extended mass memory is made available to the master bus processor engine "0". The actual function of the mass memory is not restricted, even in the arrangement shown, but rather is defined by the operating system of the master bus processor. For example, the architecture in FIG. 3 could represent an arrangement in which each PICA PEM is a platform for additional mass memory in an extended data base computer system. For such an arrangement, the individual disks of mass memory would be searched in parallel or time coincidence by associated PICA processor engine modules. The same architecture could be also used in a fault tolerant memory storage system setting, where mass memory "1" and mass memory "2" store the identical data, the reliability of which is confirmed during a readout comparison executed by the master bus processor engine and operating system. Both operational arrangements are readily implemented through revisions in the otherwise convention operating system application software of the master bus processor engine "0". Consequently, mass memories 1 and 2 do not have to be uniquely configured with specialized buses and operating systems.

Figure 4:
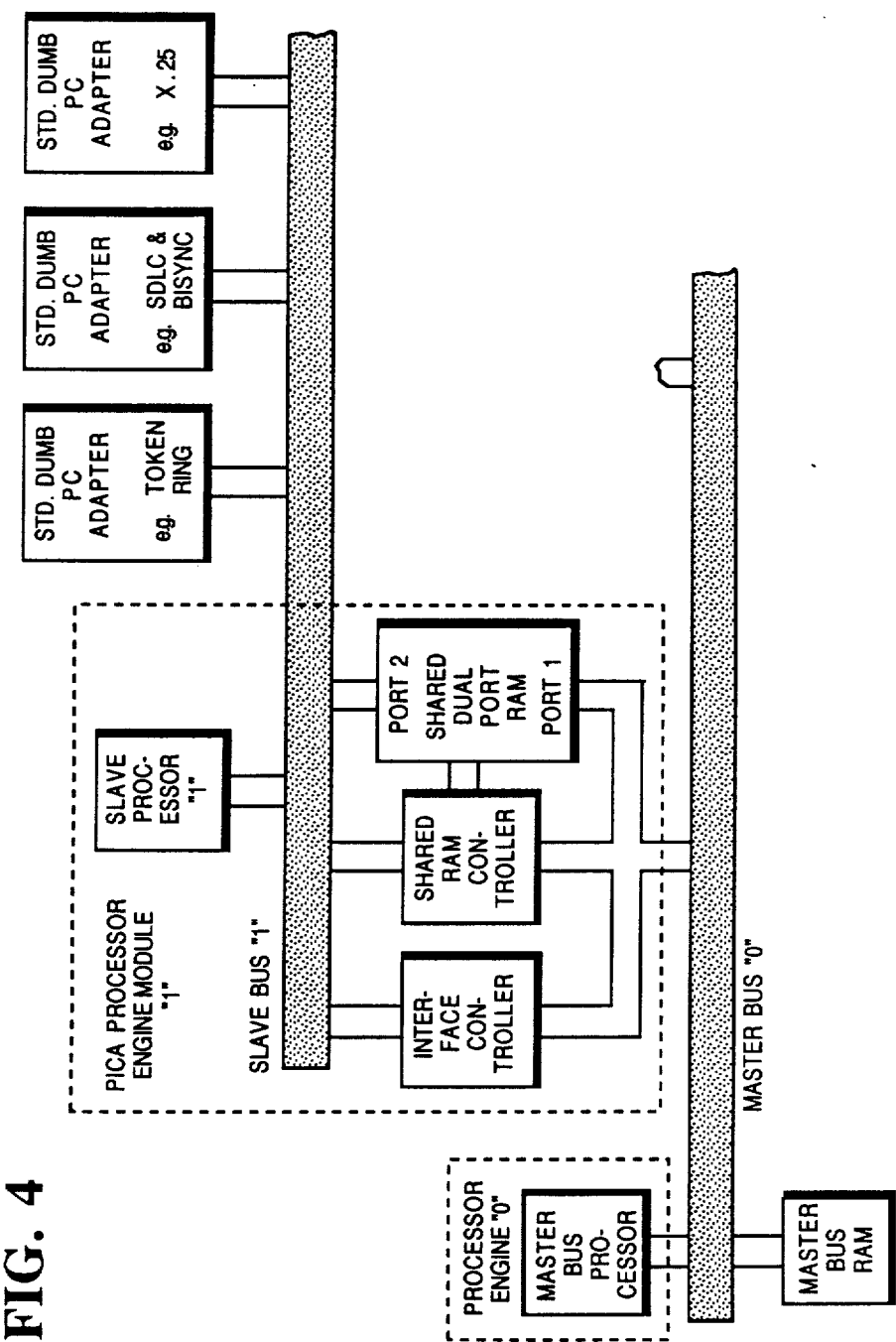
FIG. 4 schematically illustrates the use of a slave processor engine module to provide an intelligent interface between the master bus and a multiplicity of conventional communication adapter cards.

FIG. 4 depicts another embodiment of the invention, here serving as an intelligent interface between multiple "dumb" communication adapters and a busy master bus processor. The PICA PEM "1" in FIG. 4 again illustrates the usefulness of such a standard platform, recognizing its ability to serve both as a master of its own bus, slave bus "1", and as a slave on master bus "0". The various communication adapters do not have to be modified in design from their present convention. In the multiple communication path context of FIG. 4, it is foreseeable that the master bus processor will select one adapter over another for a communications operation based upon processor engine "0" priorities. Clearly it is preferred that the adapter communication software be executed by PICA processor engine module "1". In the context of FIG. 4, PICA PEM "1" engine provides the bridge between the various communication media and the master bus processor without restructuring the whole of the operating system and application software as is required in a multi-tasking system environment. Note that further horizontal integration of functions are available along both the master and the slave buses again without unduly loading the master bus processor operations or mandating a design change of the peripheral adapters.

The highly consistent structure of the modular architecture to which this invention pertains, and particularly that within the individual PICA processor engine modules, provides personal computer and workstation systems with expanded functionality at minimum hardware, software and performance expense. Relatively minor changes in the master bus processor engine software allow peripheral equipment software to be independently executed in a slave bus configured processor substantially independent of the activities undertaken by master bus processor. The presence of shared dual port RAM and associated shared RAM controller in each PICA processor engine modules provides a relatively transparent environment for the communication between the master bus processor and the peripheral equipment connected to the slave bus. Substantial migration of the master bus processor software is a further benefit that should not be under estimated, especially in situations where the master bus processor and slave bus processor are from the same microprocessor family.

It will be understood by those skilled in the art that the embodiments set forth hereinbefore are merely exemplary of the numerous arrangements by which the invention may be practices, and as such may be replaced by equivalent without department from the invention which will not be defined by appended claims.

We claim:

1. A computer system architecture comprising:
   a master bus and a slave bus, the slave bus being substantially identical to the master bus;
   a master processor connected to control and communicate over the master bus;
   a slave processor connected to control and communicate over the slave bus;
   a master RAM connected to communicate over the master bus;
   an interface controller means connected between the master bus and the slave bus to transmit asynchronous control signals between the master and slave processors;
   a shared dual port RAM connected at a first port to communicate over the master bus and connected at a second port to communicate over the slave bus; and
   a shared RAM controller means connected to the master bus, the slave bus, and the shared dual port RAM, for receiving shared dual port RAM use requests and arbitrating control over the shared dual port RAM.

2. The apparatus recited in claim 1, wherein the shared dual port RAM is concurrently addressable from both ports.

3. The apparatus recited in claim 2, wherein the master and slave buses are substantially identical in line count, functionality by line, and in signal content by line.

* * * * *